United States Patent [19]

Thomas et al.

[11] Patent Number: 4,460,893

[45] Date of Patent: Jul. 17, 1984

[54] METHOD AND APPARATUS FOR DETECTING ABNORMAL METAL-TO-METAL CONTACT IN A JOURNAL BEARING

[75] Inventors: Daniel A. Thomas, Scotia; Paul E. Malone, Schenectady; Gary F. Goth, Pleasant Valley, all of N.Y.

[73] Assignee: General Electric Company, Schenectady, N.Y.

[21] Appl. No.: 346,934

[22] Filed: Feb. 8, 1982

[51] Int. Cl.³ .............................................. G08B 21/00
[52] U.S. Cl. ...................................... 340/682; 340/589
[58] Field of Search ................................ 340/682, 589

[56] References Cited

U.S. PATENT DOCUMENTS 3,582,928  6/1971  Gaertner ............................. 340/682
4,406,169  9/1983  Ikeuchi et al. ...................... 340/682

*Primary Examiner*—Glen R. Swann, III
*Attorney, Agent, or Firm*—John F. Ahern; Paul J. Checkovich

[57] ABSTRACT

This invention provides a method and apparatus for early detection of wiping contact between a rotating shaft and bearing metal in a flow lubricated bearing. In one form of the invention, a temperature sensor is provided to monitor bearing temperature at a location on the bearing in proximity to the maximum loading position. The sensor signal is sampled periodically by a plurality of sample and hold circuits so that present and immediately past values of the bearing temperature are always on hand. The sampled values are applied to a set of subtracters, each one of which provides a signal representing the difference between two consecutively sampled temperature values. Selected ones of the temperature differences are applied to summers and the largest sum is selected by a high-value selector and compared with a preselected setpoint value representing an excessive temperature change for a given time period. Based on the comparison, a decision is automatically made as to whether the bearing temperature at the sensed location is increasing at an excessively rapid rate, found to be indicative of a temperature "spike" which in turn is evidence of metal-to-metal contact in the bearing.

12 Claims, 6 Drawing Figures

METHOD AND APPARATUS FOR DETECTING ABNORMAL METAL-TO-METAL CONTACT IN A JOURNAL BEARING

BACKGROUND OF THE INVENTION

This invention pertains to apparatus and methods for continuously monitoring the operating conditions of a large journal bearing and, more particularly, to apparatus and methods by which sudden temperature transients in the bearing are detected as an early indication of potential bearing damage.

Journal bearings of the type used in large turbomachines are susceptible to a potentially damaging phenomenon known as "wiping" or "smearing" in which metal-to-metal contact occurs between the journal surface and the bearing metal while the shaft is turning at a speed great enough to generate excessive frictional heat. Ordinarily, at or near full operating speed, the lubricant which is continuously fed to bearings of these machines forms a hydrodynamic film that supports the weight of the shaft and prevents metal-to-metal contact. Below operating speed, however, during coastdown or startup, the oil film thickness is reduced in proportion to the speed. As the film thickness decreases, a transition from hydrodynamic to boundary layer lubrication occurs. During this transition the likelihood of a wiping incident is increased and is made even more likely should there be misalignment between the journal and bearing or should the journal bear scoring marks. Great care is obviously taken in operating these machines to guard against such events. Once wiped, however, the load-carrying capacity of a bearing may be severely limited, leading to a later failure which is sufficient to force the entire machine out of service.

In the past, to gain the earliest indication that wiping has occurred, operating personnel have been instructed to closely monitor the bearing temperature by way of thermocouples, or other sensors, conventionally provided, and to be alert for sudden changes or longer term trends in the temperature pattern which deviate from previous temperature characteristics. Unfortunately, such methods have suffered from operator inattention due to the myriad of other duties incumbent upon those charged with control of large turbine-powered machines. Furthermore, although the wiping of a bearing is likely to have serious consequences, it has become such a relatively rare event that warning signs requiring human cognizance have often been either forgotten or ignored.

To alleviate these and other problems, it is a principal object of the present invention to provide a method and apparatus by which abnormal metal-to-metal contact between a journal bearing surface and the journal is detected and brought to the attention of operating personnel sufficiently early enough to allow corrective action to be taken.

SUMMARY OF THE INVENTION

The present invention provides a method and apparatus for early detection of wiping contact between a rotating shaft and bearing metal in a flow lubricated bearing. In a preferred embodiment of the invention, a temperature sensor, such as a thermocouple, is provided to monitor bearing temperature at a location on the bearing in proximity to the maximum loading position. This sensor provides a continuous signal which is sampled periodically by a plurality of sample and hold means so that present and immediately past values of the bearing temperature are always on hand. That is, each sample and hold means first samples the temperature, then holds the sampled value until next called upon to acquire a new sampled value. The sampled values are applied to a set of subtracter means, each one of which provides a signal representing the difference between two consecutively sampled temperature values. Selected ones of the temperature differences are then applied to summing means and the largest sum is then selected by a high-value selector and compared with a preselected setpoint value representing an excessive temperature change for a given time period. Based on the comparison, a decision is automatically made as to whether the bearing temperature at the sensed location is increasing at an excessively rapid rate, found to be indicative of a temperature "spike" which in turn is evidence of metal-to-metal contact in the bearing.

Most preferably, four sample and hold periods are used and the summed difference signals applied to the high-value gate represent the difference between the present temperature value and the immediately preceding sampled value; the sum of the differences of the two preceding periods; and the sum of the differences of the three preceding periods. Thus, if the temperature has increased significantly during one, two, or three time periods an indication is provided of a wiping condition in the monitored bearing.

Generally, the method of detecting abnormal metal-to-metal contact according to the invention may also be carried out by analog or digital computing means. In such implementation of the invention, it is first ascertained that the rotating shaft speed is within a range at which abnormal wiping contact can occur. The bearing temperature is continuously monitored near the maximum load-sustaining point and this temperature indication is repeatedly sampled and a number of average rates of temperature change are determined. The largest of these is then compared with a predetermined setpoint value. A wipe is thus indicated whenever the selected rate of change is greater than the setpoint value. These steps may be continuously repeated both for positive and negative rates of temperature change.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
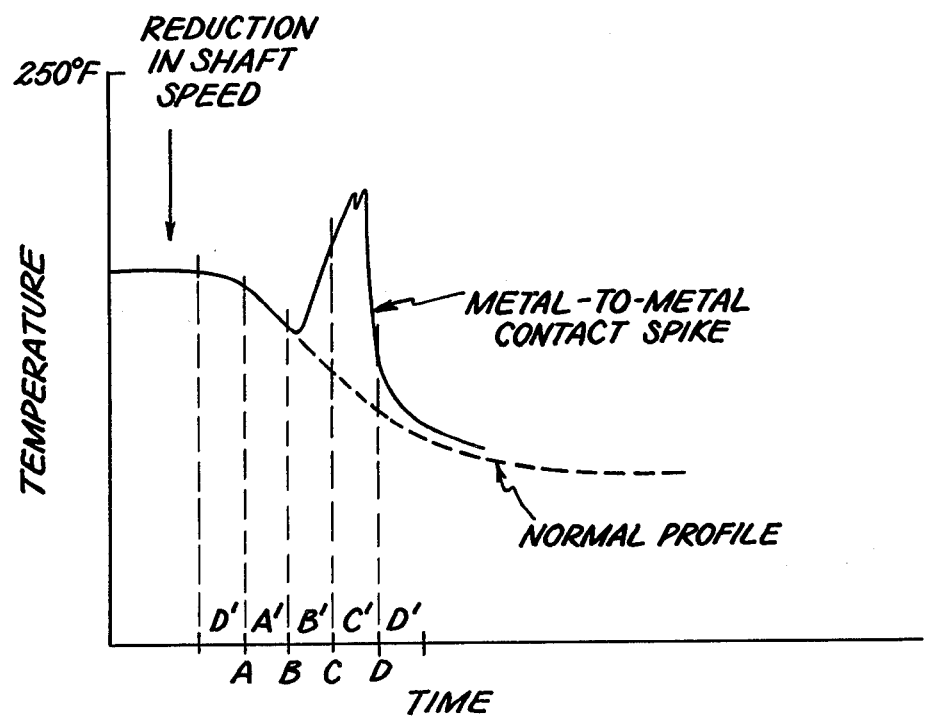
FIG. 1 illustrates a typical temperature profile of a journal bearing for a turbine during a speed reduction and a typical temperature spike due to metal-to-metal contact between the journal and bearing.

FIG. 1 illustrates a characteristic temperature spike arising from metal-to-metal contact in a flood lubricated journal bearing for a steam turbine. The dashed portion of the temperature profile indicates a normally declining temperature as the turbine speed is decreased during a shutdown. Although a temperature spike may be of such magnitude as to increase the temperature above a simple high-level alarm point, that is not always the case. Furthermore, the normal bearing temperature may vary acceptably over a range of temperatures making a simple alarm point ineffective. Thus, to generally detect a bearing wipe it is necessary to detect the temperature spike.

Figure 2:
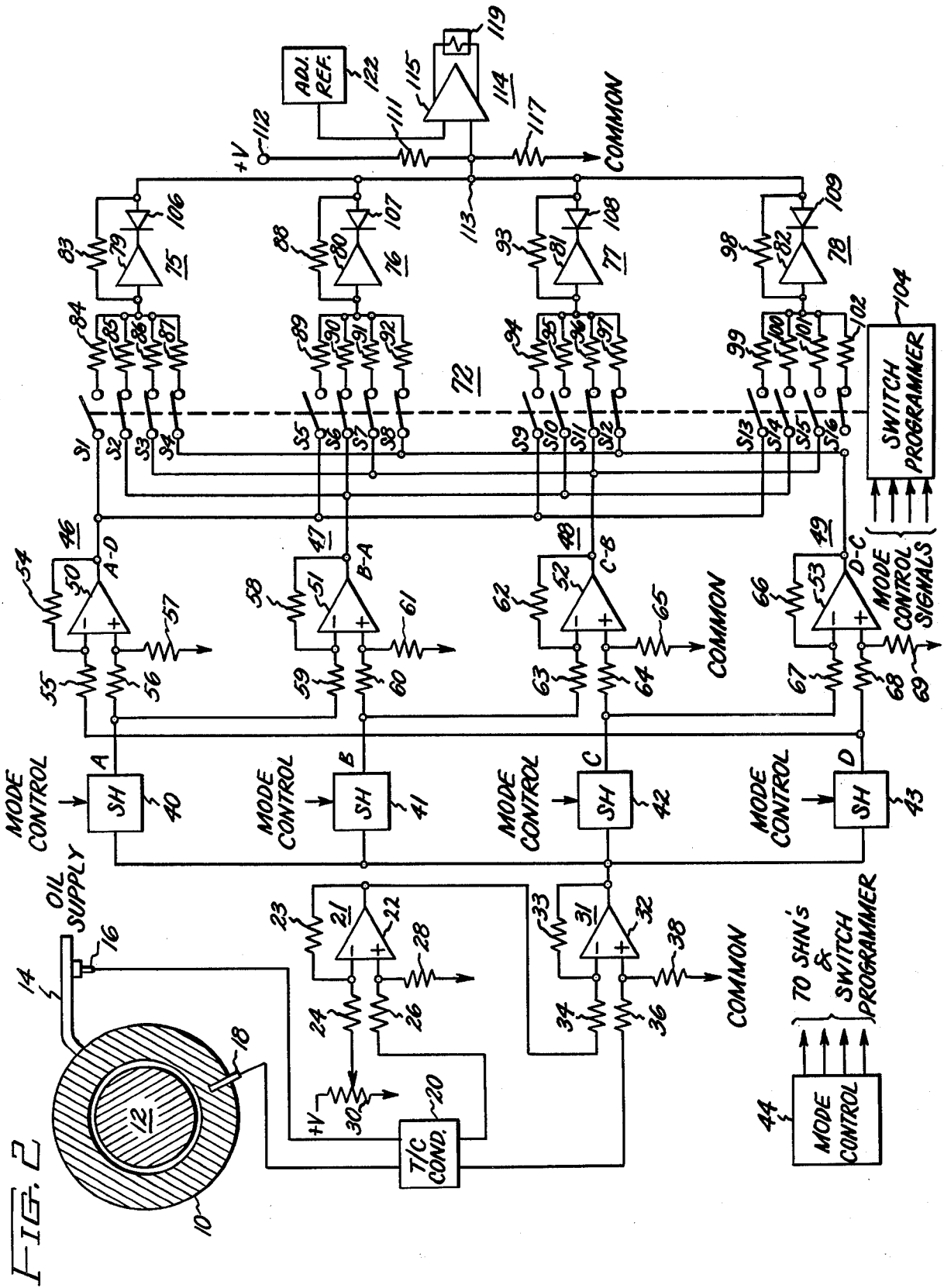
FIG. 2 is a schematic illustration of a preferred form of the invention.

Referring to FIG. 2, schematically illustrating one form of the invention, there is shown a flood-lubricated journal bearing 10 carrying a rotating journal 12. Lubricating oil is continuously fed to the bearing 10 through a supply conduit 14 which includes a thermocouple 16 mounted in the conduit 14 for continuously sensing the lubricating oil temperature. Lubricating oil enters the bearing and, whenever the shaft is rotating at sufficient speed, forms a hydrodynamic film wedge (not illustrated) between the shaft surface and the inner bearing surface. The oil film directly supports the journal 12 so that there is ordinarily no direct metal-to-metal contact. The maximum bearing load is sustained generally at the bottom of the bearing 10. A thermocouple 18, providing a signal indicative of bearing temperature, is mounted in the bearing 10 in close proximity to the maximum load-bearing point.

Both the bearing thermocouple 18 and the oil supply thermocouple 16 are connected to a thermocouple conditioning unit 20 which, in a well-known manner, provides signal conditioning to the thermocouple signals. The thermocouple signal conditioning unit 20 may include cold junction compensation, amplification, and filtering for the thermocouple signals. The two temperature signals are, however, kept separate with the oil supply signal being fed to a subtraction network 21 including operational amplifier 22; fixed resistors 23, 24, 26, and 28; and variable resistor 30. Variable resistor 30 is connected to a fixed, stable voltage source (not shown), allowing a reference voltage, representing a nominal fixed oil temperature, to be subtracted from the oil temperature signal. The reference voltage, taken from the adjustable resistor 30 and applied to the negative input of amplifier 22 may represent, for example, a nominal oil temperature of 115° F. Thus, the output of subtraction network 21 is a signal representing the bearing oil temperature after subtraction of the oil's nominal temperature value.

The bearing temperature signal from conditioning unit 20 is applied to a subtraction network 31 including operational amplifier 32 and fixed resistors 33, 34, 36, and 38. In subtraction network 31, variations in the temperature of the lubricating oil are corrected for by subtracting them out. This occurs by virtue of the lubricating oil temperature signal being applied as the second input to subtraction network 31. Thus, the output of subtraction network 31 is a signal indicative of bearing temperature independent of (i.e., corrected for) changes in the temperature of the incoming lubricating oil.

The corrected bearing temperature signal is applied in parallel to sample and hold networks 40, 41, 42, and 43 which will be more fully described hereinbelow. Functionally, however, each sample and hold network 40-43 periodically samples the input temperature signal and then holds the sampled value on its output line until the next sample period occurs. The sample and hold networks 40-43 perform their sampling operations in sequence so that no two are sampling the temperature signal at the same time. They are under the control of mode control unit 44 which supplies sequencing pulses to cause each sample and hold network 40-43 to be in either the sampling state or the holding state. Mode control network 44 is also more fully described hereinbelow.

The outputs of the sample and hold networks 40-43, denominated respectively as A, B, C, and D and appearing at correspondingly denominated circuit points, thus represent consecutively acquired bearing temperature values for the present and immediately three preceding sampling periods. The signals A, B, C, and D are applied in consecutive pairs to substantially identical subtraction networks 46, 47, 48, and 49 which are each of conventional configuration, each including an operational amplifier 50, 51, 52, and 53, respectively, and corresponding fixed resistors 54-69. The resistors 54-69 are selected to provide equal weighting to all of the input signals. The output of each subtraction network 46-49 represents the difference between consecutively acquired temperature values (corrected for fluctuations in lubricating oil temperature). The difference values are indicated at the output of the subtraction networks 46-49 as (A-D), etc.

The four difference signals are applied, in selected sets, through a programmable signal selector 72, comprised of programmed switches as S1 through S16, to final summing networks 75, 76, 77, and 78. The summing networks 75-78 are of standard configuration and comprise operational amplifiers 79-82, respectively, and fixed resistors 83-102, respectively. The resistors 83-102 are all of substantially equal resistance value.

The programmable signal selector 72 is under the control of the switch programmer 104 which determines the state of each individual switch S1-S16. Switch programmer 104 in combination with signal selector 72 is of conventional design. For example, switches S1-S16 may be operated by a set of motor-driven cams in which a stepping motor is stepped to reposition the cams to achieve the various switching states. The switch programmer 104 is controlled by the mode control unit 44 so that the set of selector switches as S1-S16 are commanded to change states coincidentally with the start of each signal sampling period of the sample and hold networks 40-43.

Figure 3:
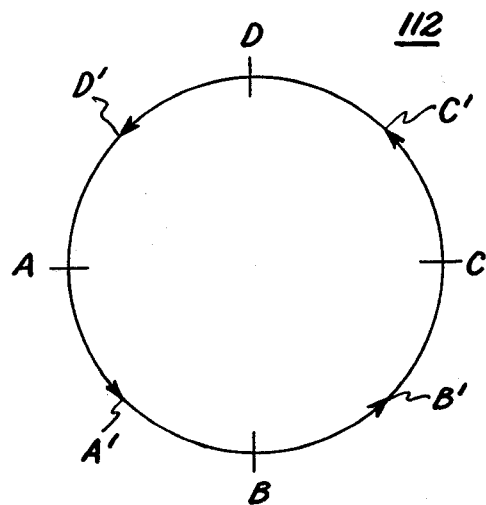
FIG. 3 is a timing and switch programming diagram applicable to the circuitry of FIG. 2.

FIG. 3 illustrates the cyclical nature of the sample and hold process and, by the Table 110, indicates the corresponding states of switches S1-S16 for the time intervals. In Table 110, "1's" indicate that a switch is closed; "0's" indicate that a switch is open. In the timing cycle diagram 112, for example, the points A, B, C, and D indicate the sample acquisition times. The intervals A', B', C', and D' represent the hold periods following the corresponding sampling times.

Referring again to FIG. 2, the signal selector 72 is programmed so that the summing networks 75-78 provide output signals, during each hold period, representing: (1) the difference signal from the immediately preceding time periods; (2) the sum of the differences for the two immediately preceding time periods; and (3) the sum of the differences for the three immediately preceding time periods. Since there are four time periods in each complete cycle, there are four summing networks 75–78. The output of one of these is redundant in each period since only three time periods are found necessary for the spike detection process. For example, as shown in FIG. 2, the signal selector 72 is in time period D'. Table 110 of FIG. 3 defines the D' state of switches S1–S16. In this state, outputs of summing networks 75 and 76 are substantially identical, both representing $(B-A)+(C-B)+(D-C)$; the output of summing network 77 is $(C-B)+(D-C)$; and the output of summing network 78 is $(D-C)$.

Associated with each summing network of 75–78 is a corresponding diode (106, 107, 108, and 109) all connected in common through resistor 111 to a positive reference voltage at terminal 112. These diodes, in combination with the positive reference voltage at terminal 112 and resistors 111 and 117 provide a high-value gate so that the signal appearing at circuit point 113 is the signal from summing networks 75–78 which is of greatest magnitude. This signal is then compared with a reference signal in a comparator network 114 including amplifier 115, and relay 119. The reference signal, supplied as one input to comparator network 114 from a reference voltage source 122 determines a threshold level. That is, whenever the signal at circuit point 113 is greater than the reference voltage from source 122, relay 119 is activated. In a well-known manner, relay 119 is effective to alert operating personnel through audio/visual alarms that the bearing temperature is changing at an excessive rate indicative of a temperature spike.

Returning to FIG. 1, examples of sample and hold periods are indicated in relation to a characteristic temperature spike. Thus, it will be recalled, that the high-value gate of FIG. 2 makes a selection, for example, at some point in its operation, of signal values $(D-C)$; $(D-C)+(C-B)$; or $(D-C)+(C-B)+(B-A)$. Although one or two of these values may sum substantially to zero (e.g., $D-C$) at least one (e.g., $(D-C)+C-B)$) is of sufficient magnitude to activate the comparator network 114, signaling the occurrence of a temperature spike and abnormal metal-to-metal contact. In general, a typical bearing temperature spike may have a duration of one to ten minutes.

Figure 4:
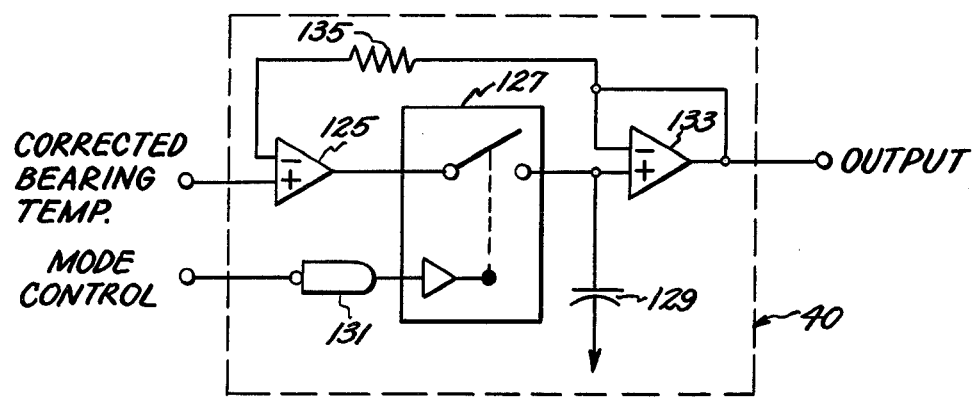
FIG. 4 is a schematic diagram of a sample and hold network suitable for use in the apparatus of FIG. 2.

FIG. 4 illustrates a sample and hold network suitable for use in each (e.g., network 40) of the sample and hold networks 40–43 of FIG. 2. In FIG. 4, the corrected bearing temperature signal is taken into an isolation amplifier 125 whose output passes to an electronic switch 127. With the switch 127 closed, the network is in the sample mode and the temperature signal is applied to storage capacitor 129. With the switch 127 open (as shown), the network is in the hold mode and previously sampled temperature data is retained as capacitor 129 remains charged. The electronic switch 127 is under the control of a repetitive pulse signal from the mode control network (44 of FIG. 2) applied through logic inverter 131. An isolation amplifier 133 and feedback resistor 135 complete the sample and hold network.

Figure 5:
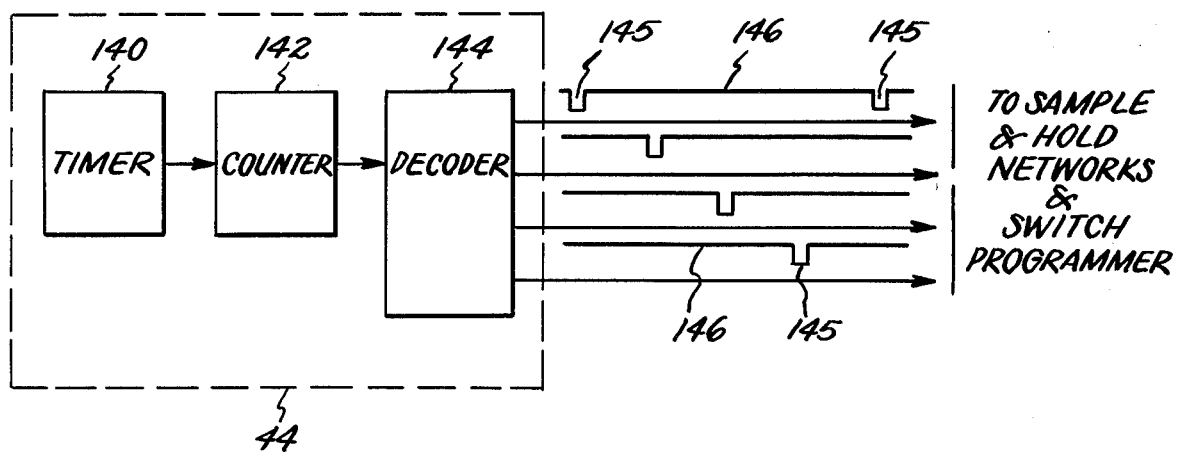
FIG. 5 is a schematic diagram of a timing network (mode control unit) suitable for use in the apparatus of FIG. 2.

FIG. 5 illustrates an implementation of mode control unit 44. A timer 140 provides a stable, fixed frequency signal which is applied to a counter 142 providing frequency division. The output of counter 142 is supplied to a decoder 144 which provides four lines of output pulse signals which are used to activate the various sample and hold networks 40–43 and the switch programmer 104, of FIG. 2. The operative elements of mode control unit 44 are well known to those of ordinary skill in the art. The output pulse signals comprise narrow sampling pulses 145, followed by substantially longer intervening hold periods 146.

Figure 6:
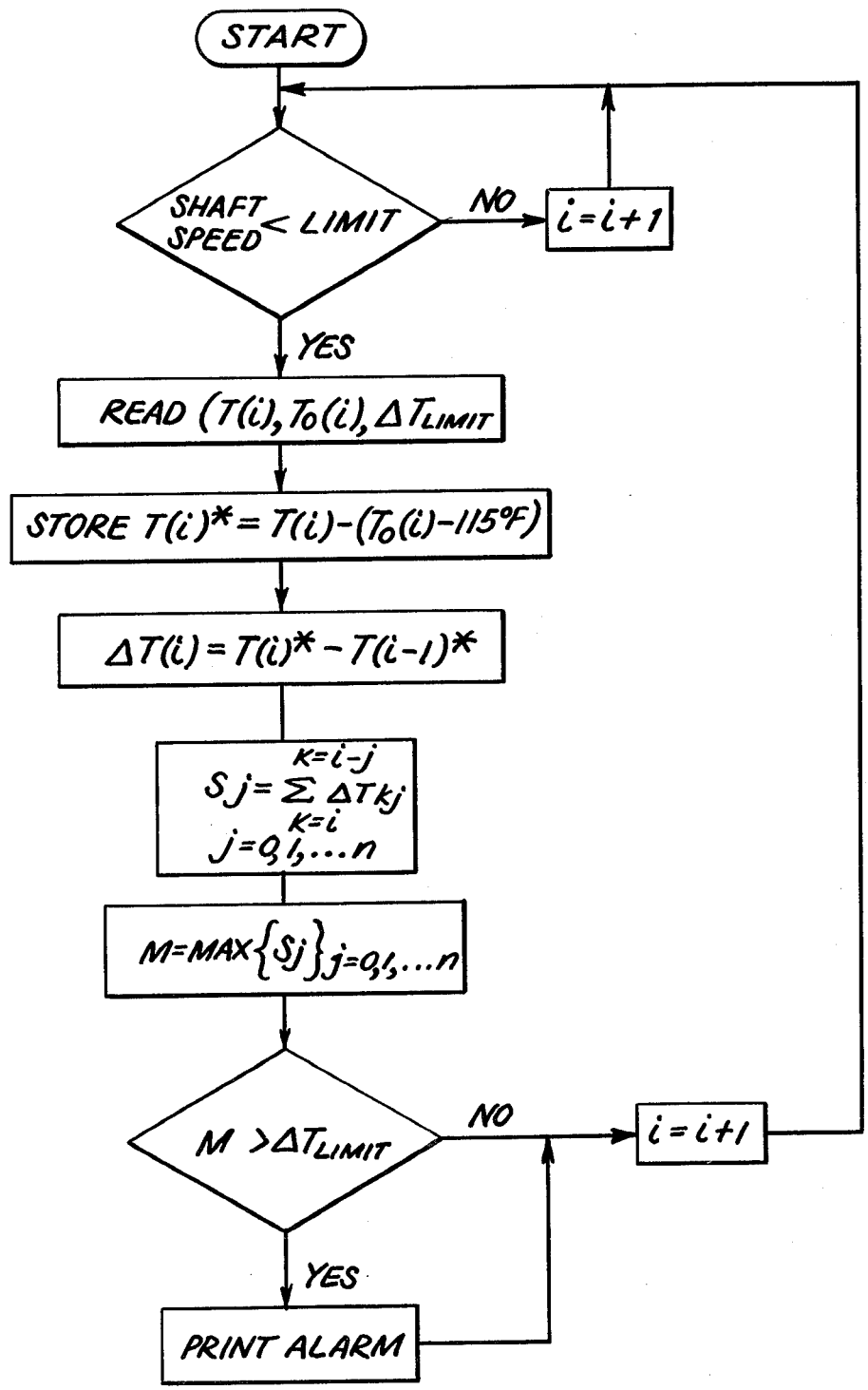
FIG. 6 is a flow chart illustrating the processing steps for a method of detecting temperature spikes according to the invention.

Although a specific form of the invention in terms of analog circuitry has been shown and described herein, it will be apparent to others of ordinary skill in the art that the invention can be implemented by various means. These include digital and analog computing means and microprocessor-based instrumentation. FIG. 6 is a flow chart illustrating the processing steps necessary for carrying the method out by any of these diverse means. The following terminology applies to the flow chart of FIG. 6:

$T(i)$ = current temperature of bearing.
$T_0(i)$ = lubricating oil temperature.
$\Delta T$ limit = maximum allowable differential temperature.
$T(i)^*$ = bearing temperature corrected for changes in oil temperature.
$\Delta T(i)$ = change in corrected bearing temperature from immediately preceding time period.
$S_j$ = sums of differences of bearing temperature where $j+1$ = the number of differences summed.
$M$ = maximum of $S_j$ for $j=0,1,2 \ldots n$.

Still further modifications will occur to those skilled in the art. It is intended to cover in the appended claims all such modifications which fall within the true spirit and scope of the invention.

The invention claimed is:

1. In combination with a flow-lubricated bearing carrying a rotating shaft, apparatus for detecting abnormal metal-to-metal contact between the bearing and shaft leading to rapidly occurring excessive bearing temperature, comprising:

first temperature sensing means disposed on said bearing for providing a signal indicative of bearing temperature;

a plurality of sample-hold means for providing a plurality of signals representing bearing temperature values attained during consecutive sampling time periods, each sample-hold means periodically sampling said temperature signal during a sampling time period and holding the sampled value during a succeeding hold time period;

a plurality of subtracter means for providing a plurality of difference signals, each subtracter means receiving two consecutive ones of said plurality of bearing temperature values and producing a difference signal indicative of the difference between said two consecutive bearing temperature signals;

a plurality of summing means providing a plurality of summed difference signals, each summing means being operative to sum selected ones of said difference signals;

signal selector means for periodically selecting sets of said plurality of difference signals to be summed in said plurality of said summing means, each summing means providing an output signal representing a sum of the difference signals for a preselected number of sampling time periods, said signal selector means and said plurality of sample-hold means having the same periodicity;

a high-value selector for receiving said plurality of summed difference signals and for selecting the highest valued one of said signals; and means for comparing said highest valued signal with a predetermined value, a value of said highest valued signal in excess of said predetermined value being indicative that bearing temperature is increasing at an excessive rate characterizing abnormal metal-to-metal contact.

2. The apparatus of claim 1 further including a second temperature sensing means disposed to provide a signal indicative of lubricant temperature; and
   means for subtracting said lubricant temperature signal from said bearing temperature signal to correct said bearing temperature signal for changes in lubricating oil temperature.

3. The apparatus of claim 2 wherein said first temperature sensing means is disposed on said bearing in proximity to a maximum load-bearing position.

4. The apparatus of claim 3 wherein said first and second temperature sensors are thermocouples.

5. The apparatus of claim 4 wherein the periodicity of said signal selector means and said plurality of sample and hold means is determined by a mode control unit generating periodic timing pulses.

6. The apparatus of claim 5 wherein said plurality of sample and hold means comprises four analog sample and hold networks operative over four consecutive sample and hold time periods.

7. The apparatus of claim 6 wherein said signal selector means comprises a set of programmable switches and said selected sets of said plurality of difference signals are selected to provide a sum of difference signals for one, two, and three consecutive time periods.

8. The apparatus of claim 7 wherein said means for comparing said highest valued signal with a predetermined value comprises an analog comparator network operative to activate audio-visual indicator means whenever said bearing temperature is increasing at an excessive rate.

9. For use with a flow-lubricated bearing carrying a rotatable shaft, a method for detecting abnormal metal-to-metal contact between the bearing and shaft, comprising the steps of:
   (a) ascertaining that shaft rotational speed is within the range at which metal-to-metal contact may occur;
   (b) continuously monitoring the temperature of the bearing at a location in proximity to a maximum load bearing point on the bearing;
   (c) repeatedly selecting a plurality of fixed duration time periods and determining the average rate of change of said bearing temperature over 1,2, ... n time periods;
   (d) repeatedly selecting the average rate of change of said bearing temperature having the greatest magnitude; and
   (e) repeatedly comparing the selected rate of change with a predetermined value, a metal-to-metal contact being indicated whenever said selected average rate of change of temperature is greater than said predetermined value.

10. The method of claim 9 wherein step (e) is repeated for both increasing and decreasing temperatures.

11. The method of claim 10 wherein n equals 3.

12. The method of claims 10 or 11 further including the step of correcting the bearing temperature obtained in step (b) for changes in lubricating oil temperature.

* * * * *